(12) United States Patent
Tokura

(10) Patent No.: US 6,320,977 B1
(45) Date of Patent: Nov. 20, 2001

(54) METHOD AND APPARATUS FOR POSITIONAL DETECTION USING PATTERN MATCHING PROCESS

(75) Inventor: Nobufumi Tokura, Fukuoka-ken (JP)

(73) Assignee: Matsushita Electric Industrial Co., Ltd, Osaka (JP)

( * ) Notice: Subject to any disclaimer, the term of this patent is extended or adjusted under 35 U.S.C. 154(b) by 0 days.

(21) Appl. No.: 08/962,842

(22) Filed: Nov. 3, 1997

Related U.S. Application Data

(63) Continuation of application No. 08/294,479, filed on Aug. 22, 1994, now abandoned, which is a continuation-in-part of application No. 07/926,672, filed on Aug. 10, 1992, now abandoned, which is a continuation-in-part of application No. 07/671,415, filed on Mar. 20, 1991, now abandoned.

(30) Foreign Application Priority Data

Apr. 4, 1990 (JP) ........................................ 2-89931

(51) Int. Cl.$^7$ ........................................ G06K 9/68
(52) U.S. Cl. ............................. 382/151; 382/291
(58) Field of Search .................... 382/145, 151, 382/217, 218, 220, 287, 291, 294; 348/87, 94, 95; 250/559.29

(56) References Cited

U.S. PATENT DOCUMENTS

| 4,556,985 | * | 12/1985 | Hongo | 382/220 |
| 4,641,355 | * | 2/1987 | Hongo et al. | 382/209 |
| 4,776,023 | * | 10/1988 | Hamada et al. | 382/141 |
| 4,908,871 | * | 3/1990 | Hara et al. | 382/141 |
| 5,046,109 | * | 9/1991 | Fujimori et al. | 382/141 |
| 5,146,509 | * | 9/1992 | Hara et al. | 382/141 |

* cited by examiner

Primary Examiner—Andrew W. Johns
(74) Attorney, Agent, or Firm—Lowe Hauptman Gopstein Gilman & Berner

(57) ABSTRACT

A first signal represents an image of an object to be inspected. Portions of the first signal are selected as second signals respectively. The second signals represent partial images of the inspected-object image respectively. The partial images are of a given size. The second signals are compared with a third signal representing a predetermined reference image of a size equal to the size of the partial images, and thereby pattern matching is executed between the partial images and the reference image. Calculation is made as to scores of the pattern matching between the partial images and the reference image. A maximum score is selected from among the calculated scores. A fourth signal is generated which represents a position of the partial image corresponding to the maximum score. The partial-image position is defined as being relative to the inspected-object image. An invalid area of the reference image is determined according to a fifth signal representing a predetermined unreliable image area. A part of the third signal, which corresponds to the invalid area of the reference image, is excluded from the pattern matching.

16 Claims, 13 Drawing Sheets

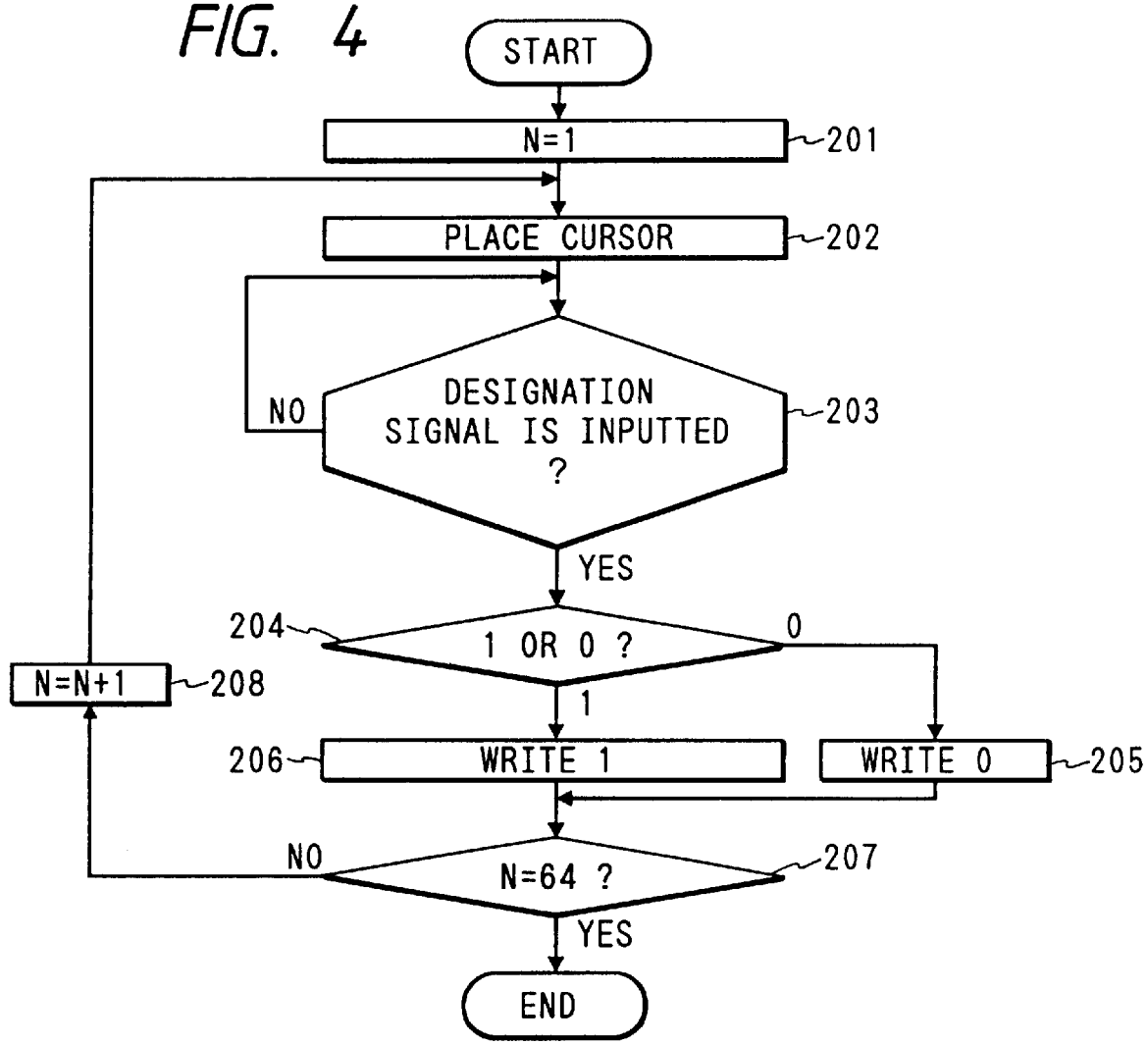

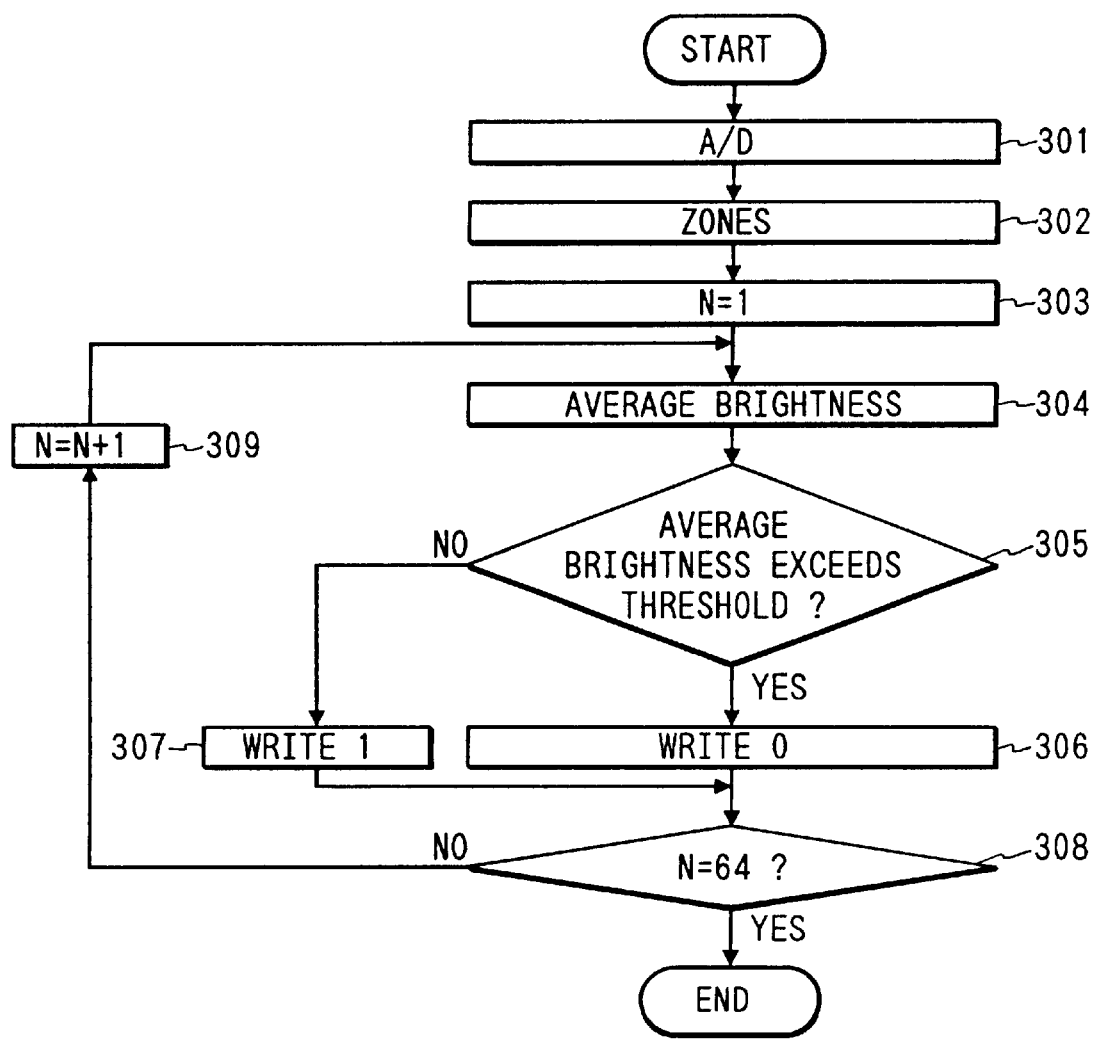

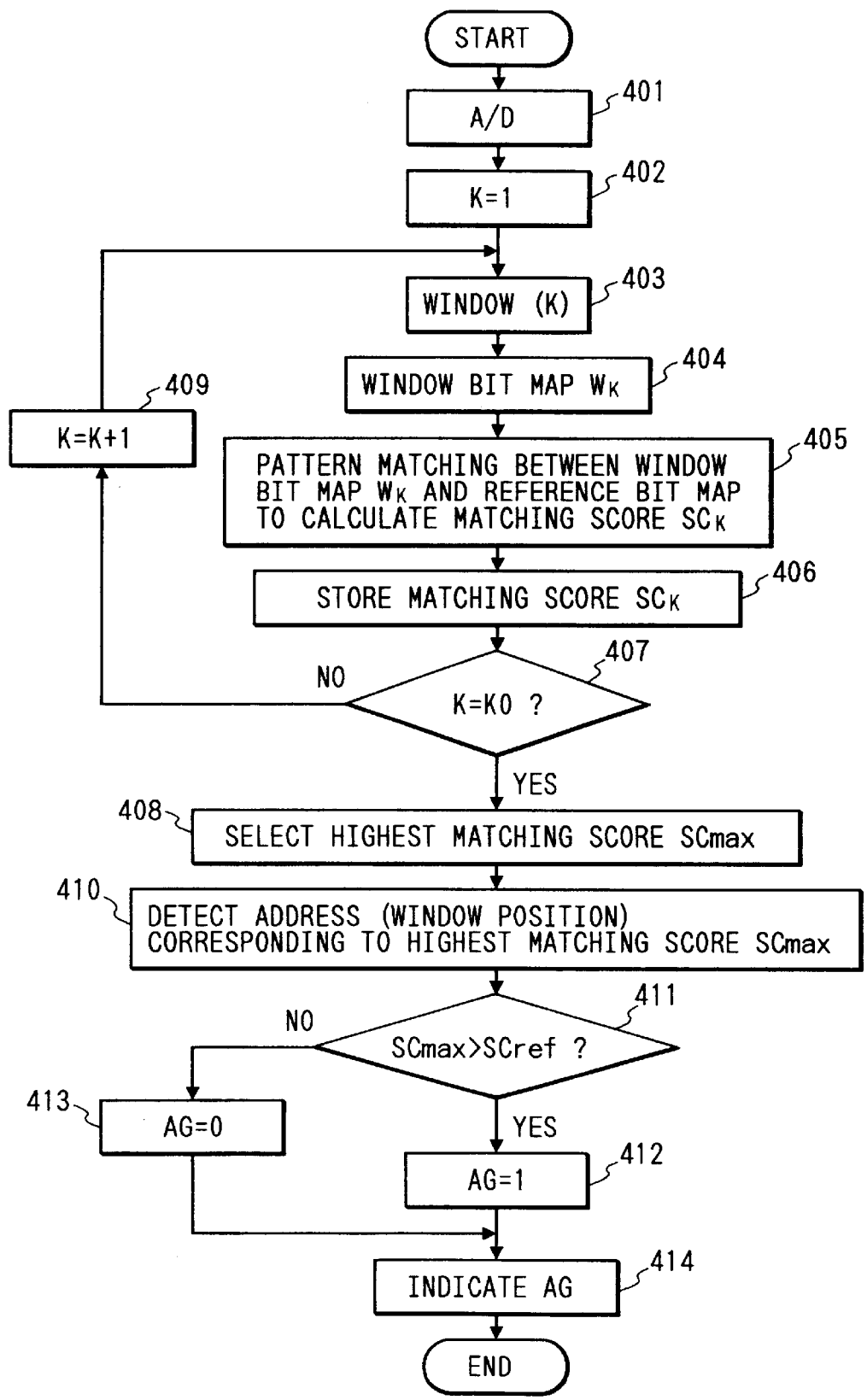

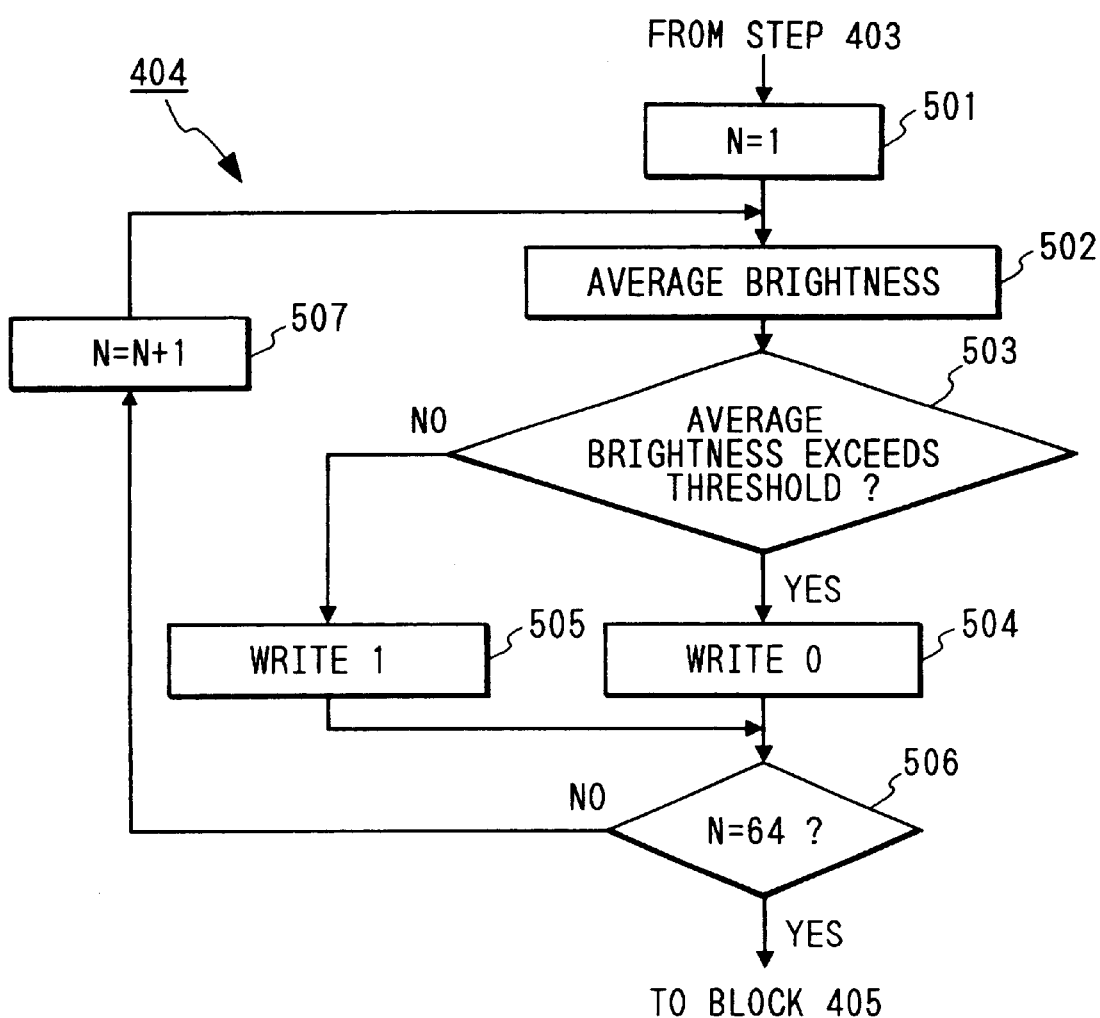

METHOD AND APPARATUS FOR POSITIONAL DETECTION USING PATTERN MATCHING PROCESS

CROSS-REFERENCES TO RELATED APPLICATIONS

This application is a continuation of Application Ser. No. 08/294,479 filed Aug. 22, 1994, now abondoned, which in turn is a continuation-in-part of U.S. patent application Ser. No. 07/926,672, filed Aug. 10, 1992, now abondoned, which in turn is a continuation-in-part of U.S. patent application Ser. No. 07/1671,415, filed Mar. 20, 1991 now abandoned.

BACKGROUND OF THE INVENTION

1. Field of the Invention

This invention relates to a method of positional detection using a pattern matching process. This invention also relates to an apparatus for positional detection using a pattern matching process.

2. Description of the Prior Art

It is well-known to use pattern recognition technologies in inspecting a wiring pattern and a parts-arrangement pattern on a printed circuit board, and positions of position-reference marks and positions of parts on a printed circuit board.

U.S. Pat. No. 4,776,023 discloses a pattern inspection method in which two kinds of images corresponding to a reference pattern and a pattern to be inspected are converted into binary images. Local images which are cut out from the binary images are compared with each other to detect differences between the cut-out images and to recognize these differences as a defect. Excess sensitivity to the different portions is moderated to the extent of allowing non-serious actual defects. By setting don't care areas, each of which consists of one pixel row neighboring on a binary boundary line in the image, and by comparing the remaining portions of the images other than the don't care areas by logical processing, it is possible to detect various defects without regarding the quantization error as a defect.

U.S. Pat. No. 4,641,355 discloses a pattern recognition apparatus which includes a memory for storing information relating to a known set of characters, means for defining a matrix of selected mesh pattern, means for comparing an unknown character with the known set of characters based on the mesh pattern, and means for storing information relating to the unknown character if it exceeds a selected minimum deviation from all known characters. Specifically, a bit matrix of the unknown pattern is obtained, and a determination is made as to minimum deviations between the cluster of characters of the unknown pattern and a group of registered cluster of characters on the basis of a stored given table. A selection is given of only an unknown pattern cluster of characters having minimum deviations exceeding a preset value.

In most of inspecting apparatus using pattern recognition, an object to be inspected is illuminated by a suitable lighting device, and an image of the object is picked up by a television camera. Due to various adverse factors such as undesirable reflection of light at a surface of the object, underexposure, or blooming, some area of the picked-up image of the object tends to be inaccurate in indicating the actual appearance of the corresponding area of the object. Such an area is referred to as an invalid area (an unreliable area). Generally, the invalid area lowers the accuracy of pattern recognition regarding the picked-up image.

SUMMARY OF THE INVENTION

It is an object of this invention to provide an improved method of positional detection using a pattern matching process.

It is another object of this invention to provide an improved apparatus for positional detection using a pattern matching process.

A first aspect of this invention provides a method comprising the steps of generating a first signal representing an image of an object to be inspected; selecting portions of the first signal as second signals respectively, the second signals representing respective partial images of the inspected-object image, the partial images being of a given size; comparing the second signals with a third signal representing a predetermined reference image of a size equal to the size of the partial images, executing pattern matching between the partial images and the reference image, and calculating scores of the pattern matching between the partial images and the reference image; selecting a maximum score from among the calculated scores; generating a fourth signal representing a position of the partial image corresponding to the maximum score, the partial-image position being relative to the inspected-object image; determining an invalid area of the reference image according to a fifth signal representing a predetermined unreliable image area; and excluding a part of the third signal, which corresponds to the invalid area of the reference image, from the pattern matching.

A second aspect of this invention provides a method comprising the steps of generating a first signal representing an image of an object to be inspected; selecting portions of the first signal as second signals respectively, the second signals representing respective partial images of the inspected-object image, the partial images being of a given size, wherein each of the partial images is divided into a plurality of zones, and each of the second signals has components corresponding to the zones respectively; comparing the second signals with a third signal representing a predetermined reference image of a size equal to the size of the partial images, executing pattern matching between the partial images and the reference image, and calculating scores of the pattern matching between the partial images and the reference image, wherein the reference image is divided into a plurality of zones corresponding to the zones of each of the partial images respectively, and the third signal has components corresponding to the zones respectively; selecting a maximum score from among the calculated scores; generating a fourth signal representing a position of the partial image corresponding to the maximum score, the partial-image position being relative to the inspected-object image; designating each of the zone-corresponding components of the third signal as one of an unreliable zone-corresponding component or a reliable zone-corresponding component according to a fifth signal representing predetermined valid and invalid image zones; and excluding the unreliable-designated zone-corresponding components of the third signal from the pattern matching.

A third aspect of this invention provides a method comprising the steps of generating first bit maps each having a plurality of bits, the first bit maps representing partial images of an image of an object to be inspected respectively, wherein each of the partial images is divided into a plurality of zones corresponding to the bits of the related first bit map respectively; comparing the first bit maps and a second predetermined bit map bit by bit, executing pattern matching between the partial images and a predetermined reference image represented by the second bit map, and calculating scores of the pattern matching between the partial images and the reference image, wherein the second bit map has a plurality of bits corresponding to the bits of each of the first bit maps, and the reference image is divided into a plurality of zones corresponding to the bits of the second bit map; selecting a maximum score from among the calculated scores; generating a signal representing a position of the partial image corresponding to the maximum score, the partial-image position being relative to the inspected-object image; designating each of the bits of the second bit map as one of an unreliable bit and a reliable bit according to a third predetermined bit map having predetermined valid and invalid bits;

and excluding the unreliable-designated bits of the second bit map from the pattern matching.

A fourth aspect of this invention provides an apparatus comprising means for generating a first signal representing an image of an object to be inspected; means for selecting portions of the first signal as second signals respectively, the second signals representing respective partial images of the inspected-object image, the partial images being of a given size; means for comparing the second signals with a third signal representing a predetermined reference image of a size equal to the size of the partial images, for executing pattern matching between the partial images and the reference image, and for calculating scores of the pattern matching between the partial images and the reference image; means for selecting a maximum score from among the scores calculated by the comparing means; means for generating a fourth signal representing a position of the partial image corresponding to the maximum score, the partial-image position being relative to the inspected-object image; means for determining an invalid area of the reference image according to a fifth signal representing a predetermined unreliable image area; and means for excluding a part of the third signal, which corresponds to the invalid area of the reference image, from the pattern matching executed by the comparing means.

A fifth aspect of this invention provides an apparatus comprising means for generating a first signal representing an image of an object to be inspected; means for selecting portions of the first signal as second signals respectively, the second signals representing respective partial images of the inspected-object image, the partial images being of a given size, wherein each of the partial images is divided into a plurality of zones, and each of the second signals has components corresponding to the zones respectively; means for comparing the second signals with a third signal representing a predetermined reference image of a size equal to the size of the partial images, for executing pattern matching between the partial images and the reference image, and for calculating scores of the pattern matching between the partial images and the reference image, wherein the reference image is divided into a plurality of zones corresponding to the zones of each of the partial images respectively, and the third signal has components corresponding to the zones respectively; means for selecting a maximum score from among the scores calculated by the comparing means; means for generating a fourth signal representing a position of the partial image corresponding to the maximum score, the partial-image position being relative to the inspected-object image; means for designating each of the zone-corresponding components of the third signal as one of an unreliable zone-corresponding component or a reliable zone-corresponding component according to a fifth signal representing predetermined valid and invalid image zones; and means for excluding the unreliable-designated zone-corresponding components of the third signal from the pattern matching executed by the comparing means.

A sixth aspect of this invention provides an apparatus comprising means for generating first bit maps each having a plurality of bits, the first bit maps representing partial images of an image of an object to be inspected respectively, wherein each of the partial images is divided into a plurality of zones corresponding to the bits of the related first bit map respectively; means for comparing the first bit maps and a second predetermined bit map bit by bit, for executing pattern matching between the partial images and a predetermined reference image represented by the second bit map, and for calculating scores of the pattern matching between the partial images and the reference image, wherein the second bit map has a plurality of bits corresponding to the bits of each of the first bit maps, and the reference image is divided into a plurality of zones corresponding to the bits of the second bit map; means for selecting a maximum score from among the scores calculated by the comparing means; means for generating a signal representing a position of the partial image corresponding to the maximum score, the partial-image position being relative to the inspected-object image; means for designating each of the bits of the second bit map as one of an unreliable bit and a reliable bit according to a third predetermined bit map having predetermined valid and invalid bits; and means for excluding the unrelible-designated bits of the second bit map from the pattern matching executed by the comparing means.

BRIEF DESCRIPTION OF THE DRAWINGS

In the drawings, like numbers represent like elements throughout the views. The various views represent the following aspects of the invention.

FIG. 4 is a flowchart of a first program operating a computer in the position detecting apparatus of FIG. 1.

FIG. 5 is a diagram showing an example of conditions of a valid/invalid bit map used in the position detecting apparatus of FIG. 1.

FIG. 6 is a flowchart of a second program operating the computer in the position detecting apparatus of FIG. 1.

FIG. 8 is a flowchart of a third program operating the computer in the position detecting apparatus of FIG. 1.

FIG. 9 is a flowchart of the details of a block in FIG. 8.

DESCRIPTION OF THE FIRST PREFERRED EMBODIMENT

A preliminary process executed before a position detecting process will be explained hereinafter with reference to FIGS. 1, 2, and 3. During the preliminary process, a printed circuit board with a local area 12W of a reference pattern 12A is placed on a table 13. The reference pattern 12A includes a letter "A". The reference pattern 12A is designed so as to correspond to a pattern to be detected. The printed circuit board with the local area 12W is illuminated by a ring-shaped light source 11. A television camera 10 picks up an image of the printed circuit board with the local area 12W through an opening of the ring-shaped light source 11.

The television camera 10 converts the picked-up image of the printed circuit board into a corresponding video signal which is fed to a computer 103. The computer 103 subjects the video signal to a known window process or a known signal segment selecting process to select a portion of the video signal which represents the image of the local area 12W, that is, the reference pattern 12A. The selected video signal is transmitted via the computer 103 to a display 101 so that the image of the reference pattern 12A is indicated on the screen of the display 101 as shown in FIG. 3. The indicated image is divided into 8 by 8 zones. Specifically, the 64 zones are arranged in a matrix of 8 rows and 8 columns. As shown in FIG. 2, an I/O port 103A of the computer 103 includes a signal generator which produces a signal representing sets of parallel vertical and horizontal lines corresponding to the boundaries between the zones. The zone-boundary representing signal is superimposed on the video signal so that the vertical and horizontal boundary lines between the zones are indicated on the screen of the display 101 as shown in FIG. 3. The I/O port 103A of the computer 103 also includes a signal generator which produces a signal representing a cursor. The cursor signal is superimposed on the video signal so that a cursor represented by the cursor signal is indicated on the screen of the display 101.

Figure 1:
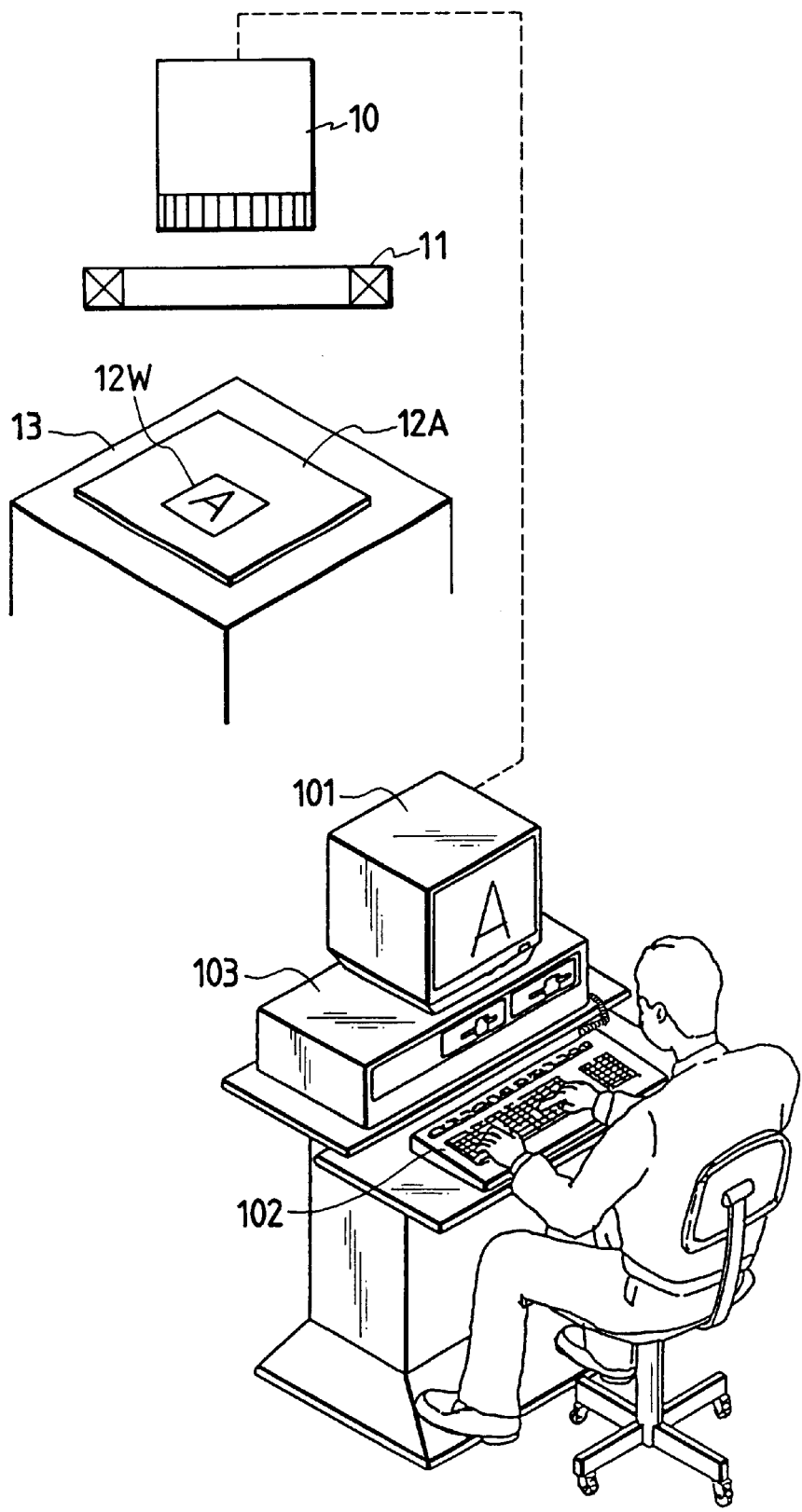
FIG. 1 is a diagram of a position detecting apparatus according to a first embodiment of this invention.
Figure 2:
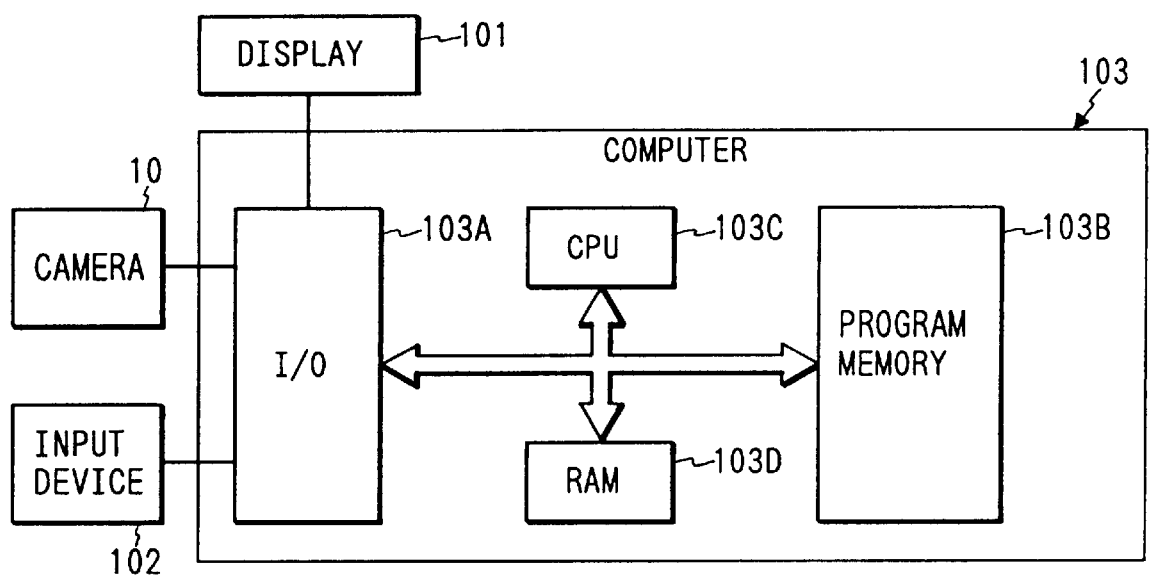
FIG. 2 is a block diagram of an electric circuit portion of the position detecting apparatus of FIG. 1.
Figure 3:
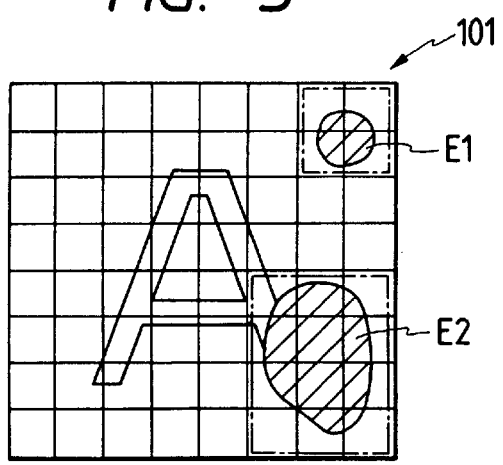
FIG. 3 is a diagram showing an example of a reference-pattern image indicated on a display in the position detecting apparatus of FIG. 1.

As shown in FIGS. 1 and 2, an input device (for example, a keyboard) 102 is connected to the computer 103. The computer 103 includes a combination of the I/O port 103A, a program memory 103B, a CPU 103C, and a RAM 103D. The computer 103 operates in accordance with programs stored in the program memory 103B.

During the preliminary process, the user operates the input device 102 to start a program for generating a valid/invalid bit map (matrix) having a size of 8 by 8 bits or pixels. FIG. 4 is a flowchart of this program. As shown in FIG. 4, a first step 201 of the program executes initialization. Specifically, the step 201 initializes the variable "N" to "1". The variable "N" is used to identify the zones. As will be made clear later, the variable "N", that is, the zone number "N", is sequentially incremented from "1" to "64" to scan the zones. Zone numbers of "1" to "64" are allotted to the respective zones. Zone numbers of "1" to "8" are sequentially allotted to the respective zones in the uppermost horizontal row in the left-to-right direction.

Similarly, zone numbers of "9" to "64" are sequentially allotted to the respective zones in the second uppermost horizontal row and the remaining lower rows. In addition, the step 201 provides a valid/invalid bit map (matrix) in the RAM 103D, the valid/invalid bit map having 8 by 8 segments which correspond to the zones respectively and which are in given initial states respectively. After the step 201, the program advances to a step 202.

The step 202 controls the display 101 to place the cursor in the zone designated by the number "N". After the step 202, the program advances to a step 203 which decides whether or not a valid/invalid designation signal has been inputted in connection with the zone designated by the number "N". While monitoring the screen of the display 101, the user decides whether each of the zones of the indicated reference pattern is reliable (valid) or unreliable (invalid). The user operates the input device 102 to input one of a valid designation signal (a "0" signal) and an invalid designation signal (a "1" signal) into the computer 103 according to the previously-mentioned user's decision in connection with the zone designated by the cursor. When a valid/invalid designation signal has been inputted, the program advances from the step 203 to a step 204. When a valid/invalid designation signal has not yet been inputted, the program repeats the step 203.

The step 204 decides whether the valid/invalid designation signal is "0" (valid) or "1" (invalid). When the valid/invalid designation signal is decided to be "0" (valid), the program advances from the step 204 to a step 205. The step 205 writes data of "0" (valid) into the segment of the valid/invalid bit map which is designated by the number "N". When the valid/invalid designation signal is decided to be "1" (invalid), the program advances from the step 204 to a step 206. The step 206 writes data of "1" (invalid) into the segment of the valid/invalid bit map which is designated by the number "N". After the steps 205 and 206, the program advances to a step 207.

The step 207 decides whether or not the number "N" reaches "64". When the number "N" does not reach "64", the program advances from the step 207 to a step 208. When the number "N" reaches "64", the program ends. The step 208 increments the number "N" by "1". After the step 208, the program returns to the step 202.

As a result, the valid/invalid bit map in the RAM 103D is completed. It is now assumed that the reproduced image of the reference pattern 12A on the screen of the display 101 has invalid areas (hatched areas) E1 and E2 as shown in FIG. 3. The user inputs the invalid designation signal (the "1" signal) for each of zones where the invalid areas E1 and E2 extend. The user inputs the valid designation signal (the "0" signal) for each of other zones. FIG. 5 shows conditions of the completed valid/invalid bit map generated for the reproduced reference-pattern image of FIG. 3.

During the preliminary process, the user operates the input device 102 to start a program for generating a reference-pattern bit map (matrix) having a size of 8 by 8 bits or pixels. FIG. 6 is a flowchart of this program. As shown in FIG. 6, a first step 301 of the program activates an A/D converter in the I/O port 103A to convert the output video signal of the television camera 10 (of FIG. 1) into a corresponding digital video signal (video or image data). In addition, the step 301 writes the digital video signal into a frame memory provided in the RAM 103D. A step 302 following the step 301 defines an area of 8 by 8 zones in the frame memory. The 8×8-zone area corresponds to the local area 12W. The function executed by the step 302 corresponds to a window process or a data segment selecting process for selection of a portion of the digital video signal which represents the image of the local area 12W, that is, the reference pattern 12A.

A step 303 following the step 302 initializes the variable "N" to "1". The variable "N" is used to identify the zones. As will be made clear later, the variable "N", that is, the zone number "N", is sequentially incremented from "1" to "64" to scan the zones. Zone numbers of "1" to "64" are allotted to the respective zones. Zone numbers of "1" to "8" are sequentially allotted to the respective zones in the uppermost horizontal row in the left-to-right direction. Similarly, zone numbers of "9" to "64" are sequentially allotted to the respective zones in the second uppermost horizontal row and the remaining lower rows. In addition, the step 303 provides a reference-pattern bit map (matrix) in the RAM 103D, the reference-pattern bit map having 8 by 8 segments which correspond to the zones respectively and which are in given initial states respectively. After the step 303, the program advances to a step 304.

The step 304 reads out the video data from the zone of the frame memory which corresponds to the number "N". In addition, the step 304 calculates an average of the brightnesses represented by the video data in the zone designated by the number "N". A step 305 following the step 304 decides whether or not the calculated average brightness exceeds a predetermined threshold value. When the calculated average brightness exceeds the predetermined threshold value, the program advances from the step 305 to a step 306. The step 306 writes data of "0" (white) into the segment of the reference-pattern bit map which is designated by the number "N". When the calculated average brightness does not exceed the predetermined threshold value, the program advances from the step 305 to a step 307. The step 307 writes data of "1" (black) into the segment of the reference-pattern bit map which is designated by the number "N". After the steps 306 and 307, the program advances to a step 308.

The step 308 decides whether or not the number "N" reaches "64". When the number "N" does not reach "64", the program advances from the step 308 to a step 309. When the number "N" reaches "64", the program ends. The step 309 increments the number "N" by "1". After the step 309, the program returns to the step 304.

As a result, the reference-pattern bit map in the RAM 103D is completed.

Figure 7:
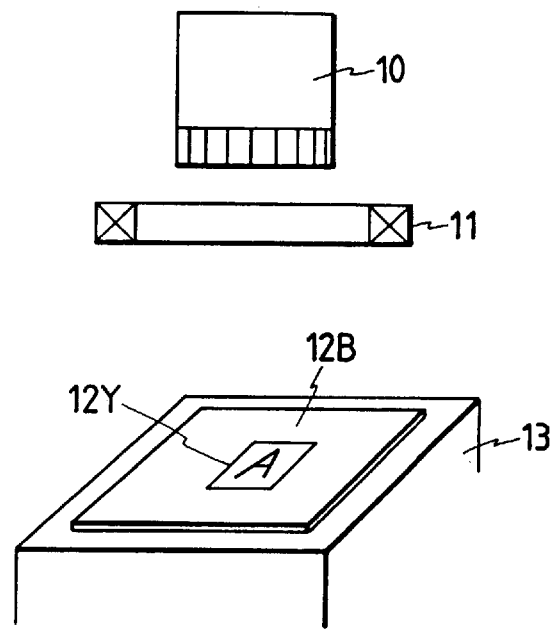
FIG. 7 is a diagram showing an inspected object, a camera, a light source, and a table in the position detecting apparatus of FIG. 1.

A position detecting process is executed after the completion of the previously-mentioned preliminary process. During the position detecting process, as shown in FIG. 7, a printed circuit board with a local area 12Y of a pattern 12B to be detected is placed on the table 13. The printed circuit board is an object to be inspected. The previously-mentioned reference pattern 12A corresponds to the pattern 12B to be detected. The printed circuit board with the local area 12Y is illuminated by the ring-shaped light source 11. The television camera 10 picks up an image of the printed circuit board with the local area 12Y through the opening of the ring-shaped light source 11.

The television camera 10 converts the picked-up image of the printed circuit board into a corresponding video signal which is fed to the computer 103. The video signal representing the picked-up image of the printed circuit board is processed by the computer 103 as follows.

During the position detecting process, the user operates the input device 102 to start a program for positional detection. FIG. 8 is a flowchart of this program. As shown in FIG. 8, a first step 401 of the program activates an A/D converter in the I/O port 103A to convert the output video signal of the television camera 10 into a corresponding digital video signal (video or image data). In addition, the step 401 writes the digital video signal into a frame memory provided in the RAM 103D. The digital video signal stored in the frame memory is 1-frame video data representing the picked-up image of the printed circuit board.

A step 402 following the step 401 initializes the variable "K" to "1". The variable "K" indicates an address denoting the place of a window or a search area relative to the 1-frame video data region in the frame memory. After the step 402, the program advances to a step 403.

The step 403 defines an area of 8 by 8 zones in a place in the frame memory as a window or a search area. The step 403 determines the place in accordance with the address "K".

When the address "K" is "1", the window (the search area) occupies the left-upper corner of the 1-frame video data region.

During a subsequent period, each time the address "K" is incremented by "1", the window (the search area) shifts rightward by one zone. After the window (the search area) reaches the right-upper corner of the 1-frame video data region, the window (the search area) shifts downward by one zone and returns to the left edge of the 1-frame video data region in response to a next increment of the address "K". During a subsequent period, each time the address "K" is incremented by "1", the window (the search area) shifts rightward by one zone. After the window (the search area) reaches the right edge of the 1-frame video data region, the window (the search area) shifts downward by one zone and returns to the left edge of the 1-frame video data region in response to a next increment of the address "K". Such movements of the window (the search area) are reiterated until the address "K" reaches a given number "K0". When the address "K" is equal to the given number "K0", the window (the search area) occupies the right-lower corner of the 1-frame video data region.

A block 404 following the step 403 generates a window-pattern bit map (matrix) $W_K$ having a size of 8 by 8 bits or pixels from the video data in the window designated by the address "K".

A block 405 following the block 404 executes matching between the window-pattern bit map $W_K$ and the reference-pattern bit map in consideration of the valid/invalid bit map, and calculates the score $SC_K$ of the matching which relates to the address "K".

A step 406 following the block 405 stores information of the matching score $SC_K$ into the RAM 103D.

A step 407 following the step 406 decides whether or not the address "K" reaches the given number "K0". When the address "K" reaches the given number "K0", the program advances from the step 407 to a step 408. When the address "K" does not reach the given number "K0", the program advances from the step 407 to a step 409.

The step 409 increments the address "K" by "1". After the step 409, the program returns to the step 403.

The step 408 selects the highest matching score SCmax from among the matching scores $SC_1$, $SC_2$, $SC_3$, . . . , $SC_{K0-1}$, and $SC_{K0}$.

A step 410 following the step 408 decides the address "Kp" related to the highest matching score SCmax. The decided address "Kp" agrees with one of the addresses "1", "2", "3", . . . , "K0−1", and "K0". The decided address "Kp"

indicates the position of the local area 12Y relative to the printed circuit board which has the pattern 12B corresponding to the reference pattern 12A. The function executed by the step 410 means generation of a signal representing the position of the part of the inspected-object image which relates to the highest matching score SCmax. After the step 410, the program advances to a step 411.

The step 411 compares the highest matching score SCmax with a predetermined reference value (a predetermined threshold value) SCref. When the highest matching score SCmax is larger than the reference value SCref, the program advances from the step 411 to a step 412. The step 412 sets a pattern agreement flag "AG" to "1". When the highest matching score SCmax is not larger than the reference value SCref, the program advances from the step 411 to a step 413. The step 413 sets the pattern agreement flag "AG" to "0". After the steps 412 and 413, the program advances to a step 414. The step 414 controls the display 101 so that the state of the pattern agreement flag "AG" will be indicated on the screen of the display 101. After the step 414, the program ends.

As understood from the previous description, the execution of the program of FIG. 8 detects the position of the local area 12Y relative to the printed circuit board. It should be noted that the local area 12Y has the pattern 12B corresponding to the reference pattern 12A.

FIG. 9 shows the details of the bit map generating block 404.

As shown in FIG. 9, the bit map generating block 404 has a step 501 following the step 403 of FIG. 8. The step 501 initializes the variable "N" to "1". The variable "N" is used to identify the zones. As will be made clear later, the variable "N", that is, the zone number "N", is sequentially incremented from "1" to "64" to scan the zones. Zone numbers of "1" to "64" are allotted to the respective zones. Zone numbers of "1" to "8" are sequentially allotted to the respective zones in the uppermost horizontal row in the left-to-right direction. Similarly, zone numbers of "9" to "64" are sequentially allotted to the respective zones in the second uppermost horizontal row and the remaining lower rows. In addition, the step 501 provides a window-pattern bit map (matrix) $W_K$ in the RAM 103D, the window-pattern bit map $W_K$ having 8 by 8 segments which correspond to the zones respectively and which are in given initial states respectively. After the step 501, the program advances to a step 502.

The step 502 reads out the video data from the zone of the window (the search area) in the frame memory which corresponds to the number "N". In addition, the step 502 calculates an average of the brightnesses represented by the video data in the zone designated by the number "N". A step 503 following the step 502 decides whether or not the calculated average brightness exceeds a predetermined threshold value. When the calculated average brightness exceeds the predetermined threshold value, the program advances from the step 503 to a step 504. The step 504 writes data of "0" (white) into the segment of the window-pattern bit map $W_K$ which is designated by the number "N". When the calculated average brightness does not exceed the predetermined threshold value, the program advances from the step 503 to a step 505. The step 505 writes data of "1" (black) into the segment of the window-pattern bit map $W_K$ which is designated by the number "N". After the steps 504 and 505, the program advances to a step 506.

The step 506 decides whether or not the number "N" reaches "64". When the number "N" does not reach "64", the program advances from the step 506 to a step 507. When the number "N" reaches "64", the program advances from the step 506 to the block 405 of FIG. 8. The step 507 increments the number "N" by "1". After the step 507, the program returns to the step 502.

As a result, the window-pattern bit map $W_K$ in the RAM 103D is completed.

Figure 10:
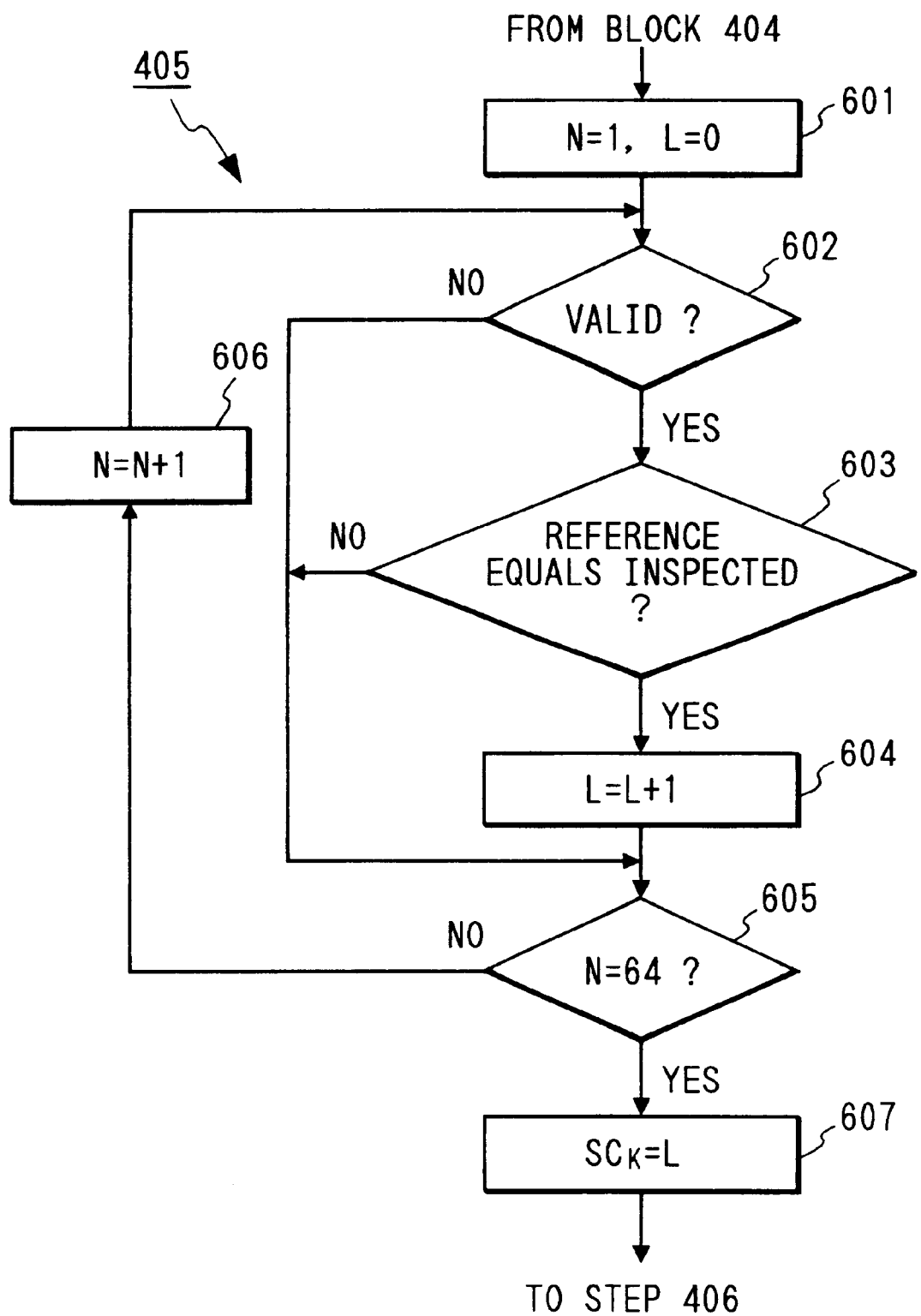
FIG. 10 is a flowchart of the details of another block in FIG. 8.

FIG. 10 shows the details of the matching block 405 in which the contents of the reference-pattern bit map and the contents of the window-pattern bit map $W_K$ are compared bit by bit in consideration of the valid/invalid bit map. As shown in FIG. 10, the matching block 405 includes a step 601 following the bit map generating block 404 of FIG. 8. The step 601 initializes the variable "N" to "1". The variable "N" is used to identify the segments (the bits) of the valid/invalid bit map, the reference-pattern bit map, and the window-pattern bit map $W_K$. As will be made clear later, the variable "N", that is, the segment (bit) number "N", is sequentially incremented from "1" to "64" to scan the segments (bits). Segment (bit) numbers of "1" to "64" are allotted to the respective segments (bits) of the valid/invalid bit map, the reference-pattern bit map, and the window-pattern bit map $W_K$. Segment (bit) numbers of "1" to "8" are sequentially allotted to the respective segments (bits) in the uppermost horizontal row in the left-to-right direction. Similarly, segment (bit) numbers of "9" to "64" are sequentially allotted to the respective segments (bits) in the second uppermost horizontal row and the remaining lower rows. In addition, the step 601 initializes the variable "L" to "0". As will be made clear later, at a final stage, the variable "L" denotes the number of the segments (bits) of the reference-pattern bit map which are equal in state to the corresponding segments (bits) of the window-pattern bit map $W_K$. After the step 601, the program advances to a step 602.

The step 602 decides whether the state of the segment (bit) of the valid/invalid bit map which is designated by the number "N" is "0" (valid) or "1" (invalid). When the state of this segment of the valid/invalid bit map is decided to be "0" (valid), the program advances from the step 602 to a step 603. When the state of this segment of the valid/invalid bit map is decided to be "1" (invalid), the program jumps from the step 602 to a step 605.

The step 603 decides whether or not the states of the segments (bits) of the reference-pattern bit map and the window-pattern bit map $W_K$ which are designated by the number "N" are equal to each other. When the states of these segments (bits) of the reference-pattern bit map and the window-pattern bit map $W_K$ are decided to be equal to each other, the program advances from the step 603 to a step 604. The step 604 increments the number "L" by "1". When the states of these segments (bits) of the reference-pattern bit map and the window-pattern bit map $W_K$ are decided to be not equal to each other, the program jumps from the step 603 to the step 605. After the step 604, the program advances to the step 605.

The step 605 decides whether or not the number "N" reaches "64". When the number "N" does not reach "64", the program advances from the step 605 to a step 606. When the number "N" reaches "64", the program advances from the step 605 to a step 607. The step 606 increments the number "N" by "1". After the step 606, the program returns to the step 602.

As a result, the states of the segments (bits) of the reference-pattern bit map are compared with the states of the corresponding segments (bits) of the window-pattern bit map $W_K$ respectively. The step 602 inhibits the "invalid"

segments (bits) of the reference-pattern bit map and the window-pattern bit map $W_K$ from being compared to each other, and enables comparison to be executed only on the "valid" segments (bits) of the reference-pattern bit map and the window-pattern bit map $W_K$. When the program advances to the step 607, the number "L" denotes the number of the "valid" segments (bits) of the reference-pattern bit map which are equal in state to the corresponding segments (bits) of the window-pattern bit map $W_K$. The step 607 sets the matching score $SC_K$ equal to the number "L". After the step 607, the program advances to the step 406 of FIG. 8.

DESCRIPTION OF THE SECOND PREFERRED EMBODIMENT

Figure 11:
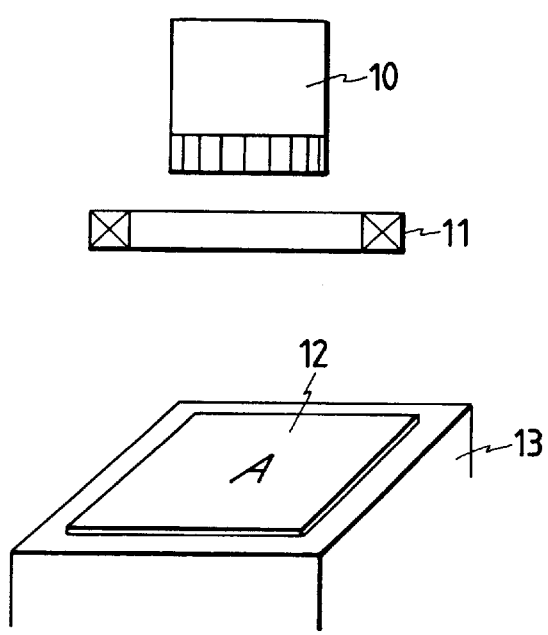
FIG. 11 is a diagram showing a sample, a camera, a light source, and a table in a position detecting apparatus according to a second embodiment of this invention.

With reference to FIG. 11, a sample 12 such as a board formed with a letter "A" is placed on a table 13. The sample 12 is designed so as to correspond to an object to be inspected. The sample 12 is illuminated by an annular light source 11. The sample 12 is observed by a camera 10 via an opening of the annular light source 11.

Figure 12:
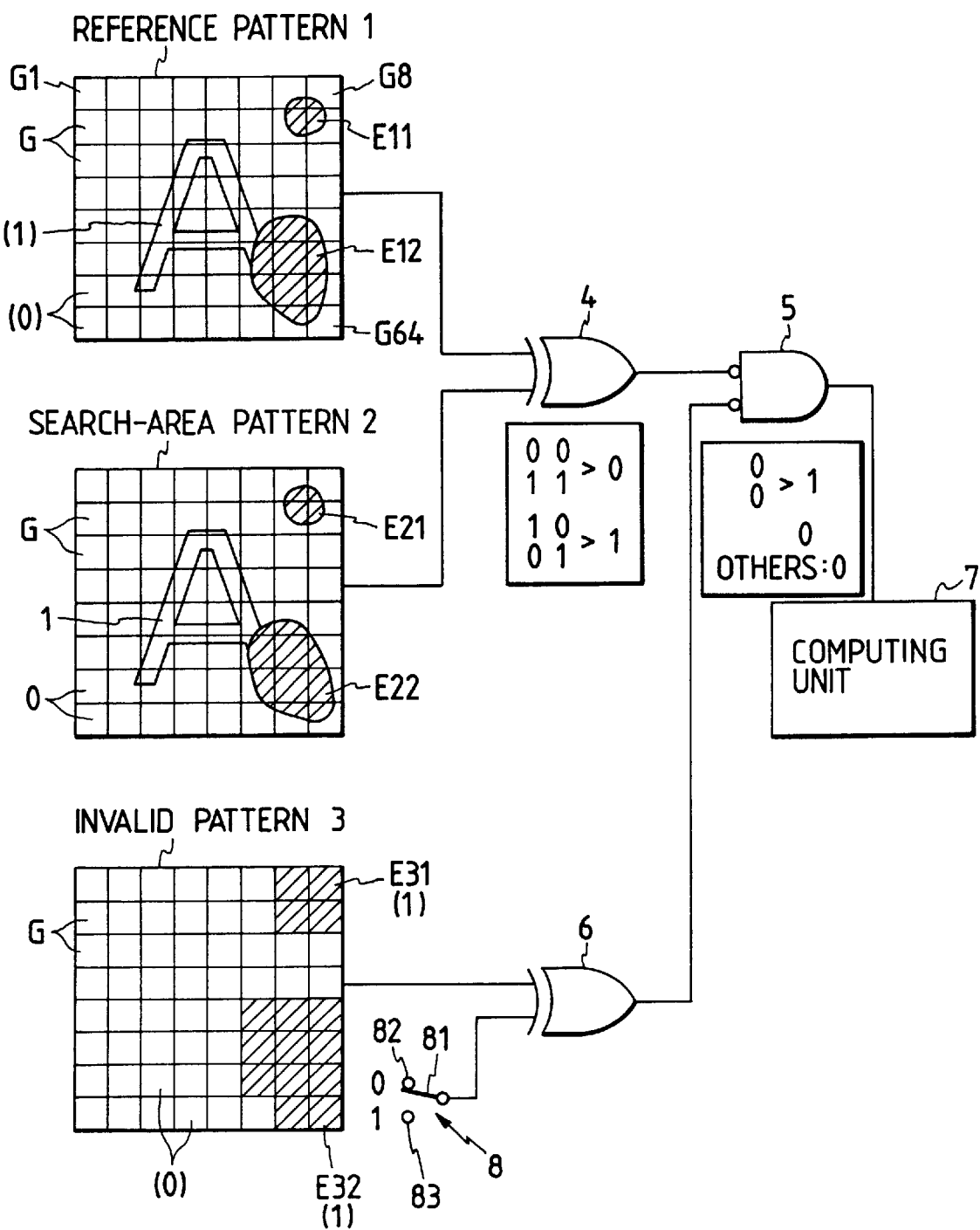
FIG. 12 is a diagram showing an electric circuit portion of the position detecting apparatus according to the second embodiment of this invention.

The following description relates the various patterns and logical processing, shown in FIG. 12, to the imaging arrangement of FIG. 11, and should be read with reference to these figures. A reference pattern 1, shown in FIG. 12, is obtained by the camera 10 observing the sample 12 (see FIG. 11). The reference pattern 1 is composed of 8 by 8 pixels G. A pattern matching process will be executed in connection with the letter "A" in the reference pattern 1. In general, some areas of the letter "A" in the reference pattern 1 are unreliable (invalid) due to reflection of light at the surface of the sample 12, the light being radiated from the light source 11. In the illustrated example of FIG. 12, the unreliable areas are denoted by shaded portions E11 and E12.

An object to be inspected is placed on the table 13. A searcharea pattern 2 is generated on the basis of the output signal of the camera 10 which represents an image of the inspected object. Unreliable (invalid) areas E21 and E22 appear in the search-area pattern 2 in correspondence with the unreliable areas E11 and E12 in the reference pattern 1 respectively.

An invalid pattern 3 is formed by designating the pixels of the reference pattern 1 which correspond to the unreliable areas E11 and E12. In the lower part of the illustrated example of FIG. 12, a set of four shaded pixels is designated as an invalid area E31 corresponding to the unreliable area E11, and a set of eleven shaded pixels is designated as an invalid area E32 corresponding to the unreliable area E12.

Each of the reference pattern 1, the search-area pattern 2, and the invalid pattern 3 is represented by an image signal or a video signal having pixel components. As will be made clear later, the invalid areas E31 and E32 are excluded from the pattern matching computation.

An image signal representative of the reference pattern 1 is applied to a first input terminal of an Exclusive OR logic circuit 4. The image signal of the reference pattern 1 has a sequence of pixel components. An image signal representative of the search-area pattern 2 is applied to a second input terminal of the Exclusive OR logic circuit 4. The image signal of the search-area pattern 2 has a sequence of pixel components. The application of the image signal of the reference pattern 1 to the Exclusive OR logic circuit 4 is synchronized with the application of the image signal of the search-area pattern 2 to the Exclusive OR logic circuit 4 so that the image signals of the reference pattern 1 and the search-area pattern 2 will be synchronously processed pixel by pixel.

An image signal representative of the invalid pattern 3 is applied to a first input terminal of an Exclusive OR logic circuit 6. The image signal of the invalid pattern 3 has a sequence of pixel components. The application of the image signal of the invalid pattern 3 to the Exclusive OR logic circuit 6 is synchronized with the application of the image signal of the search-area pattern 2 to the Exclusive OR logic circuit 4 so that the image signals of the invalid pattern 3 and the search-area pattern 2 will be synchronously processed pixel by pixel. A change-over switch 8 has a movable contact 81 and two stationary contacts 82 and 83. The movable contact 81 is connected to either of the stationary contacts 82 and 83. Voltages representing binary values "0" and "1" are applied to the stationary contacts 82 and 83 respectively. The movable contact 81 is connected to a second input terminal of the Exclusive OR logic circuit 6.

The output signals of the Exclusive OR logic circuits 4 and 6 are fed to first and second input terminals of a NAND circuit 5. The output signal of the NAND circuit 5 is fed to a computing unit 7 for executing pattern matching calculation.

Reliable (valid) pixels G of the reference pattern 1, the search-area pattern 2, and the invalid pattern 3 are represented by binary data (or multi-value data) fed to the Exclusive OR logic circuits 4 and 6.

A description will now be given of a pattern matching method including a process of excluding the unreliable areas E11 and E12 from matching. First, the movable contact 81 is connected to the stationary contact 82 (the "0" side) in the change-over switch 8. In the reference pattern 1 and the search-area pattern 2, the pixels G where the letter "A" extends are represented by the binary value "1", and the other pixels G are represented by the binary value "0". Therefore, in the case where the signals "0" and "1" of the 64 pixels G of the reference pattern 1 and the search-area pattern 2 are sequentially fed to the Exclusive OR logic circuit 4 in a scanned manner, the output signal of the Exclusive OR logic circuit 4 is "0" when the signals of the corresponding pixels G of the reference pattern 1 and the search-area pattern 2 are the same in logic state such as ("0", "0") or ("1", "1"), and the output signal of the Exclusive OR logic circuit 4 is "1" when the signals of the corresponding pixels G of the reference pattern 1 and the search-area pattern 2 are different in logic state such as ("1", "0") or ("0", "1"). Thus, when the signals of the corresponding pixels G of the reference pattern 1 and the search-area pattern 2 are different, the output signal of the Exclusive OR logic circuit 4 is "1" and thus the output signal of the NAND circuit 5 is "0". When the signals of the corresponding pixels G of the reference pattern 1 and the search-area pattern 2 are equal, the output signal of the Exclusive OR logic circuit 4 is "0" and thus the output signal of the NAND circuit 5 is determined according to the output signal of the Exclusive OR logic circuit 6. The signals of the pixels G in the invalid pattern 3 except for the invalid areas E31 and E32 are "0". The movable contact 81 is connected to the stationary contact 82 (the "0" side) in the change-over switch 8. Thus, for the reliable (valid) pixels G, the signals of "0" are applied to the input terminals of the Exclusive OR logic circuit 6 respectively so that the output signal of the Exclusive OR logic circuit 6 is "0". Therefore, in this case, the output signal of the NAND circuit 5 is "1". The output "1" signal of the NAND circuit 5 is fed to the computing unit 7. On the other hand, the binary value "1" is assigned to the pixels G of the invalid areas E31 and E32 in the invalid pattern 3. Thus, for the unreliable (invalid) pixels G, the signal of "1" and the signal of "0" are applied to the input terminals of the Exclusive OR logic circuit 6 respectively so that the output signal of the Exclusive OR logic circuit 6 is "1". Therefore, in this case, the output signal of the NAND circuit 5 is "0". The output "0" signal of the NAND circuit 5 is fed to the computing unit 7.

Even if the signals of the corresponding pixels G of the reference pattern 1 and the search-area pattern 2 are coincident in the invalid areas E31 and E32, the output signal of the NAND circuit 5 is "0" which has no effect on pattern matching calculation executed by the computing unit 7. The unreliable invalid areas E31 and E32 are excluded from the matching calculation in this way, so that the accuracy of the recognition result of the matching calculation can be improved.

Figure 13:
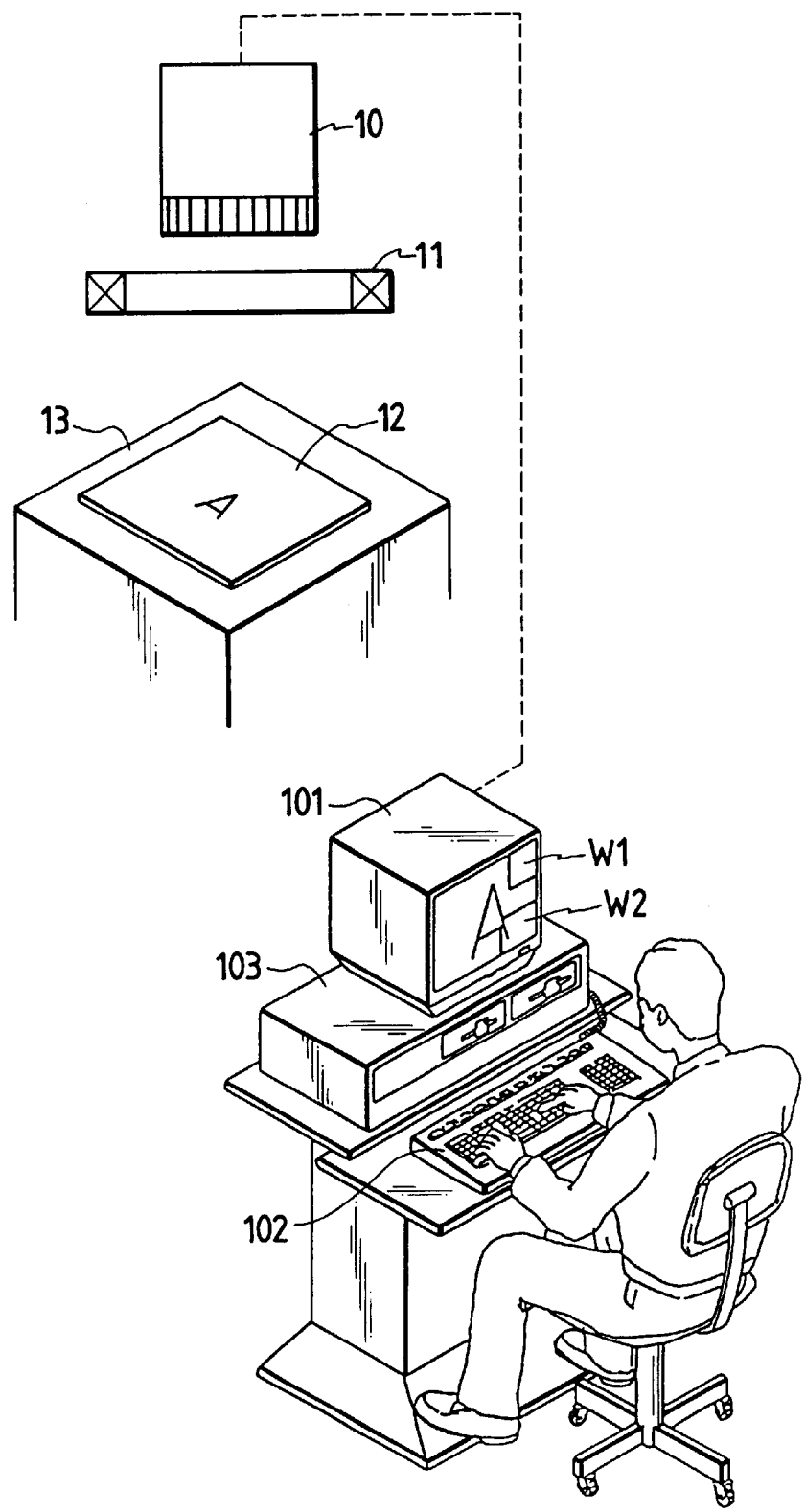
FIG. 13 is a diagram of the position detecting apparatus according to the second embodiment of this invention.
Figure 15:
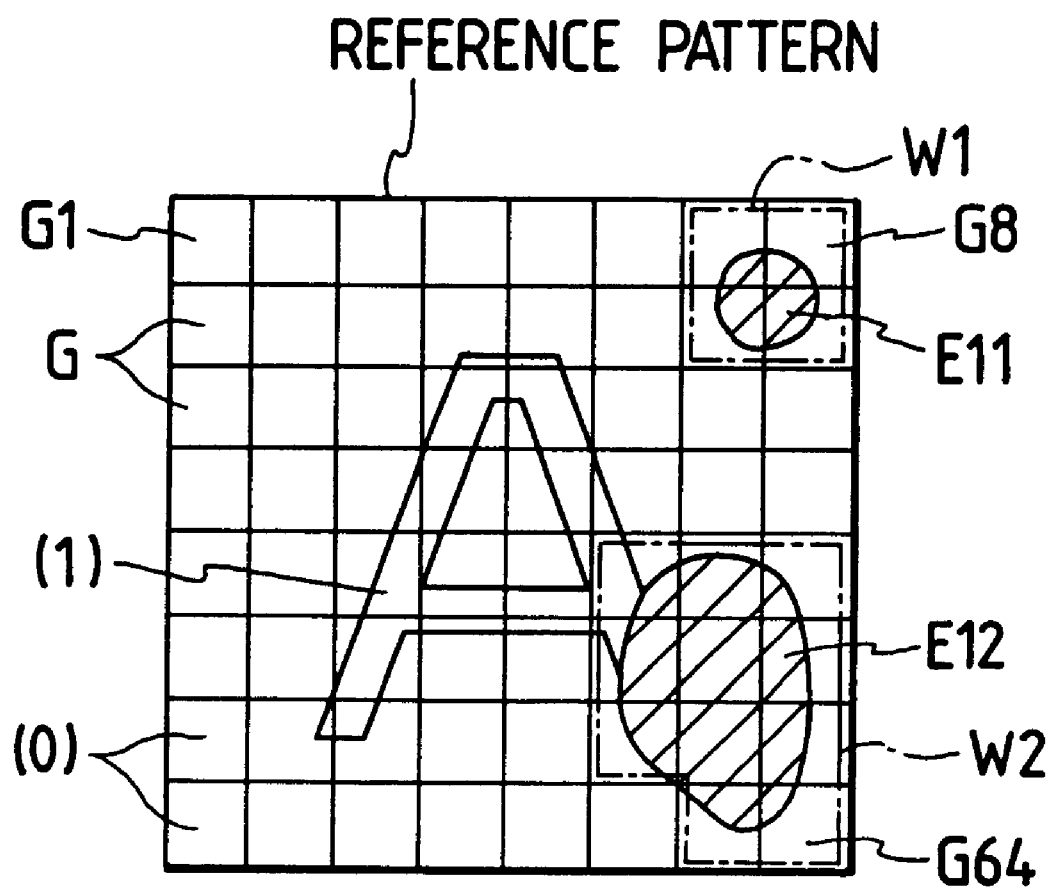
FIG. 15 is a diagram showing an example of a reference pattern used in the position detecting apparatus according to the second embodiment of this invention.

The invalid pattern 3 is formed or set in the following manner using the reference pattern 1. The user who observes the sample 12 through the camera 10 determines the pixels corresponding to the unreliable (invalid) areas E11 and E12. The user designates or sets the invalid areas E31 and E32 corresponding to the pixels in the unreliable areas E11 and E12. In more detail, as shown in FIG. 13, the image of the sample 12 is picked up by the camera 10 and the picked-up image represented by the output signal of the camera 10 is indicated on a display 101. The user observes the indicated image on the display 101, and determines whether each of the indicated pixels is reliable (valid) or unreliable (invalid). The user controls a computer 103 to which the display 101 and a keyboard 102 are connected. The user operates the keyboard 102 so that windows W1 and W2 enclosing the unreliable areas E11 and E12 will be set on the indicated image on the display 101 as shown in FIGS. 13 and 15.

Figure 14:
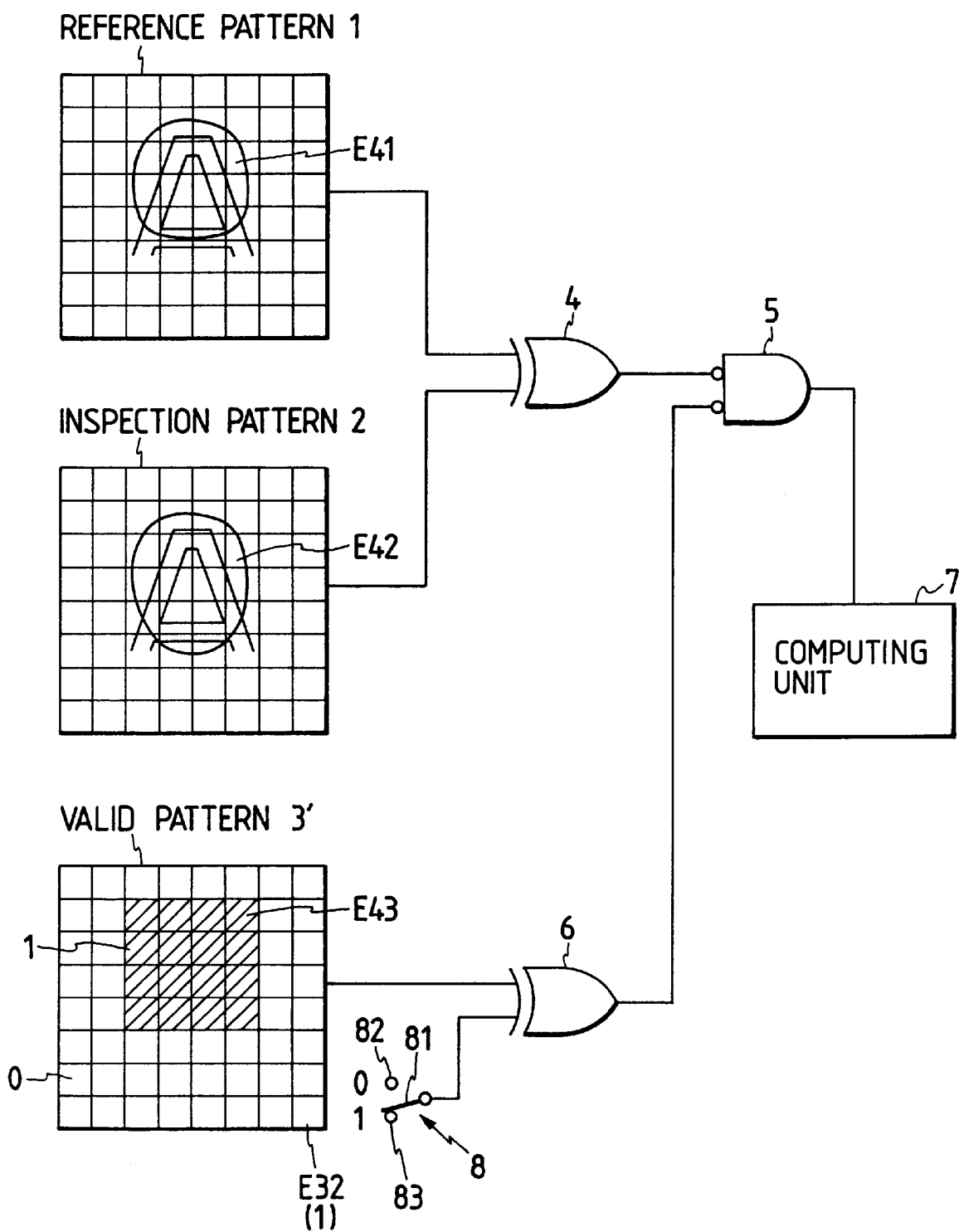
FIG. 14 is a diagram showing the electric circuit portion of the position detecting apparatus according to the second embodiment of this invention.

A description will now be given of cases where a major part of the reference pattern 1 is unreliable and only a minority of the pixels G in the reference pattern is reliable (that is, a majority of the pixels is unreliable). In these cases, the pattern matching method is performed by setting the change-over switch 8 as shown in FIG. 14. Specifically, the movable contact 81 is connected to the stationary contact 83 (the "1" side) in the change-over switch 8.

In the illustrated example of FIG. 14, only an area E41 having 16 pixels of the reference pattern 1 is reliable (valid) while the remaining pixels of the reference pattern 1 are unreliable (invalid). In the inspection pattern 2, only an area E42 which is substantially the same as the area E41 is reliable (valid). A valid area E43 of a valid pattern 3' is set to a portion corresponding to the reliable area E41. Pattern matching will be performed in consideration of only the valid area E43 as described later. The valid pattern 3' is formed by designating the pixels of the reference pattern 1 which correspond to the reliable area E41. In the lower part of the illustrated example of FIG. 14, a set of sixteen shaded pixels is designated as a valid area E43 corresponding to the reliable area E41. The valid pattern 3' is represented by an image signal or a video signal having pixel components.

An image signal representative of the valid pattern 3' is applied to the first input terminal of the Exclusive OR logic circuit 6. The image signal of the valid pattern 3' has a sequence of pixel components. The application of the image signal of the valid pattern 3' to the Exclusive OR logic circuit 6 is synchronized with the application of the image signal of the inspection pattern 2 to the Exclusive OR logic circuit 4 so that the image signals of the invalid pattern 3 and the inspection pattern 2 will be synchronously processed pixel by pixel.

In the illustrated example of FIG. 14, the change-over switch 8 continues to transmit the "1" signal to the Exclusive OR logic circuit 6. The signals of the pixels G in the valid pattern 3' except the valid area E43 are "0". Thus, for the unreliable pixels G, the signal of "1" and the signal of "0" are applied to the input terminals of the Exclusive OR logic circuit 6 respectively so that the output signal of the Exclusive OR logic circuit 6 is "1". Therefore, the output signal of the NAND circuit 5 is "0". The output "0" signal of the NAND circuit 5 is fed to the computing unit 7. Even if the signals of the corresponding pixels G of the reference pattern 1 and the inspection pattern 2 are coincident in the unreliable areas, the output signal of the NAND circuit 5 is "0" which has no effect on pattern matching calculation executed by the computing unit 7. The unreliable invalid area is excluded from the matching calculation in this way, so that the accuracy of the recognition result of the matching calculation can be improved. On the other hand, the signals of the pixels G of the valid area E43 in the valid pattern 3' are "1". For the valid area E43, when the signals of the pixels G of the reference pattern 1 are the same in logic state as the signals of the pixels G of the inspection pattern 2, the output signal of the NAND circuit 5 is "1". When the signals of the pixels G of the reference pattern 1 are different in logic state from the signals of the pixels G of the inspection pattern 2, the output signal of the NAND circuit 5 is "0".

The valid pattern 3' is formed or set in a manner basically similar to the manner of forming or setting the invalid pattern 3. Specifically, the user who observes the sample 12 through the camera 10 determines the pixels corresponding to the reliable area E41. The user designates or sets the valid area E43 corresponding to the pixels in the reliable area E41.

Figure 16:
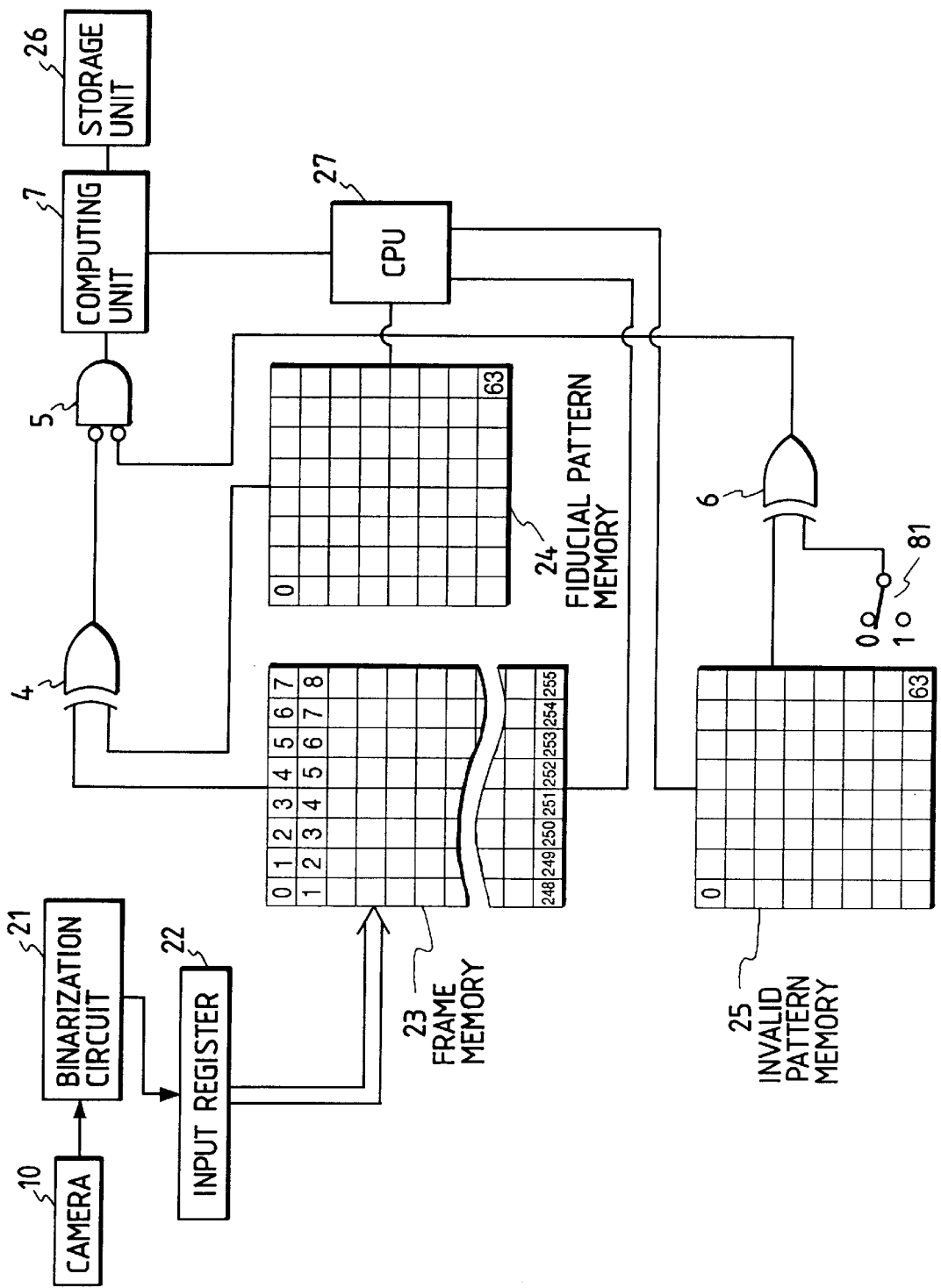
FIG. 16 is a diagram showing an electric circuit portion of the position detecting apparatus according to the second embodiment of this invention.

As shown in FIG. 16, the camera 10 is followed by a binarization circuit or an A/D converter 21. An image of the object to be inspected is converted into a corresponding video signal by the camera 10. The binarization circuit 21 receives the video signal from the camera 10, and converts the received video signal into a corresponding binary signal (data).

The binarization circuit 21 is successively followed by an input register 22 and a frame memory 23. The binarization circuit 21 outputs the binary signal to the input register 22. The binary signal (data) is temporarily stored in the input register 22 before being written into the frame memory 23. After the writing of the binary signal (data) into the frame memory 23 has been completed, all the components of the binary signal (data) which are stored in the frame memory 23 represent one frame of the object image taken by the camera 10. One frame is composed of, for example, 16 by 16 pixels.

The frame memory 23 is connected to the Exclusive OR logic circuit 4. The frame memory 23 is controlled by a CPU 27 which operates in accordance with a program stored therein. The control of the frame memory 23 by the CPU 27 is such that a search area of 8 by 8 pixels is provided in one frame represented by the data in the frame memory 23. The data in the search area corresponds to the search-area pattern 2 of FIGS. 12 and 14. The data are sequentially read out from the search area, being transferred from the frame memory 23 to the Exclusive OR logic circuit 4. Furthermore, each time the readout of all the data from the search area has been completed, the search area is moved. These processes are reiterated so that the search area is moved throughout one frame.

Specifically, at an initial stage, the search area occupies the left-upper corner of one frame. During a subsequent interval, the search area is periodically shifted rightward one pixel by one pixel. After the search area reaches the right-upper corner of one frame, the search area is shifted downward by one pixel and is returned to the left edge of one frame. During a subsequent interval, the search area is periodically shifted rightward one pixel by one pixel. After the search area reaches the right edge of one frame, the search area is shifted downward by one pixel and is returned to the left edge of one frame. Such movements of the search area are reiterated until the search area reaches the right-lower corner of one frame.

In other words, a given number of different search areas are sequentially provided in one frame. The positions of the search areas are different from each other. The CPU 27 has information of different addresses assigned to the search areas respectively.

A memory 24 is connected to the Exclusive OR logic circuit 4. The memory 24 stores data representing a fiducial pattern which is the same as the reference pattern 1 of FIGS. 12 and 14. The fiducial pattern is composed of 8 by 8 pixels. The memory 24 is controlled by the CPU 27 so that the fiducial pattern data are sequentially transferred therefrom to the Exclusive OR logic circuit 4.

A memory 25 is connected to the Exclusive OR logic circuit 6.

The memory 25 stores data representing the invalid pattern 3 of FIGS. 12 and 14. The invalid pattern is composed of 8 by 8 pixels. The memory 25 is controlled by the CPU 27 so that the invalid pattern data are sequentially transferred therefrom to the Exclusive OR logic circuit 6.

For each of the search areas, the computing unit 7 calculates a matching score in response to the output signal from the NAND circuit 5. The matching score agrees with the total number of pixels at which the search-area pattern and the fiducial pattern are equal in logic state. The computing unit 7 receives information of the address of the present search area from the CPU 27.

The computing unit 7 is connected to a storage unit 26. The computing unit 7 is controlled by the CPU 27 so that, for each of the search areas, the computing unit 7 writes information of the calculated matching score and information of the address of the present search area into the storage unit 26.

After the signal processing with respect to the final search area has been completed, the matching scores and the addresses of the respective search areas are stored in the storage unit 26. Then, the computing unit 7 is controlled by the CPU 27 so that the computing unit 7 selects the highest (maximum) matching score from among the matching scores in the storage unit 26. In addition, the computing unit 7 reads out the address corresponding to the highest matching score from the storage unit 26. The computing unit 7 feeds the CPU 27 with information of the highest matching score and information of the address corresponding to the highest matching score.

The CPU 27 checks whether or not the highest matching score is greater than a specified value. When the highest matching score is greater than the specified value, the CPU 27 accepts the highest matching score. Otherwise, the CPU 27 rejects the highest matching score. The CPU 27 uses the address corresponding to the highest matching score as an indication of the position of a local area in the inspected object which has a pattern corresponding to the fiducial pattern (reference pattern).

What is claimed is:

1. A method comprising the steps of:
    generating a first signal representing an image of an object to be inspected;
    selecting portions of the first signal as second signals respectively, the second signals representing respective partial images of the inspected-object image, the partial images being of a given size;
    comparing the second signals with a third signal representing a predetermined reference image of a size equal to the size of the partial images, executing pattern matching between the partial images and the reference image, and calculating scores of the pattern matching between the partial images and the reference image;
    selecting a maximum score from among the calculated scores;
    generating a fourth signal representing a position of the partial image corresponding to the maximum score, the partial-image position being relative to the inspected-object image;
    determining an invalid area of the reference image according to a fifth signal representing a predetermined unreliable image area; and
    excluding a part of the third signal, which corresponds to the invalid area of the reference image, from the pattern matching.
    wherein the predetermined unreliable image area is an area within the reference image which fails to provide an accurate indication of an actual appearance of a corresponding area of the reference image due to reflection of light.

2. A method as recited in claim 1, wherein the reference image includes a background portion and an effective portion, and
    wherein said step of determining an invalid area of the reference image includes determining an invalid area having at least a part thereof in the effective portion of the reference image, whereby at least a part of the invalid area of the reference image extends in the effective portion of the reference image,
    said excluding step thereby excluding a part of the effective portion of said reference image from the pattern matching with the partial images of the inspected-object image.

3. A method as recited in claim 2, wherein said step of determining an invalid area of the reference image includes determining a defective portion in the effective portion of the reference image,
    said excluding step thereby excluding the defective portion in the effective portion of said reference image from the pattern matching with the partial images of the inspected-object image.

4. A method as recited in claim 3, wherein said step of determining an invalid area comprises identifying an area which is invalid due to reflection of light.

5. A method comprising the steps of:
    generating a first signal representing an image of an object to be inspected;
    selecting portions of the first signal as second signals respectively, the second signals representing respective partial images of the inspected-object image, the partial image being of a given size, wherein each of the partial images is divided into a plurality of zones, and each of the second signals has components corresponding to the zones respectively;
    comparing the second signals with a third signal representing a predetermined reference image of a size equal to the size of the partial images, executing pattern matching between the partial images and the reference image, and calculating scores of the pattern matching between the partial images and the reference image, wherein the reference image is divided into a plurality of zones corresponding to the zones of each of the partial images respectively, and the third signal has components corresponding to the zones respectively;

selecting a maximum score from among the calculated scores;

generating a fourth signal representing a position of the partial image corresponding to the maximum score, the partial-image position being relative to the inspected-object image;

designating each of the zone-corresponding components of the third signal as one of an unreliable zone-corresponding component and a reliable zone-corresponding component according to a fifth signal representing predetermined valid and invalid image zones; and excluding the unreliable-designated zone-corresponding components of the third signal from the pattern matching;

wherein the zone-corresponding components of the third signal designated as unreliable zone-corresponding components are zone-corresponding components which fail to accurately indicate actual appearances of corresponding portions of the reference image due to reflection of light.

6. A method as recited in claim 5, wherein the reference image includes a background portion and an effective portion, wherein at least a part of one invalid image zone to be represented by said fifth signal extends in the effective portion of the reference image, and comprising the further step of generating said fifth signal to represent said one invalid image zone having at least a part thereof extending in the effective portion of the reference image, said excluding step thereby excluding a part of the effective portion of said reference image from the pattern matching with the partial images.

7. A method comprising the steps of:

generating first bit maps each having a plurality of bits, the first bit maps representing partial images of an image of an object to be inspected respectively, wherein each of the partial images is divided into a plurality of zones corresponding to the bits of the related first bit map respectively;

comparing the first bit maps and a second predetermined bit map bit by bit, executing pattern matching between the partial images and a predetermined reference image represented by the second bit map, and calculating scores of the pattern matching between the partial images and the reference image, wherein the second bit map has a plurality of bits corresponding to the bits of each of the first bit maps, and the reference image is divided into a plurality of zones corresponding to the bits of the second bit map;

selecting a maximum score from among the calculated scores;

generating a signal representing a position of the partial image corresponding to the maximum score, the partial-image position being relative to the inspected-object image;

designating each of the bits of the second bit map as one of an unreliable bit and a reliable bit according to a third predetermined bit map having predetermined valid and invalid bits; and excluding the unreliable-designated bits of the second bit map from the pattern matching, wherein the bits of the second bit map designated as unreliable-bits fail to provide accurate indications of actual appearances of corresponding portions of the reference image due to reflection of light.

8. A method as recited in claim 7, wherein said reference image includes a background portion and an effective portion and at least one of said second bit maps of the reference image includes an effective portion representing said effective portion of said reference image, wherein at least one of the invalid bits of the third predetermined bit map is in a position corresponding to the effective portion of the reference image, said step of designating each of the bits of the second bit map comprises designating at least one of the bits in the effective portion of said at least one second bit map of the reference image as an unreliable bit, and said excluding step comprises excluding said at least one of the bits in the effective portion of said at least one second bit map representing said predetermined reference image from pattern matching with the first bit maps representing said partial images.

9. An apparatus comprising:

means for generating a first signal representing an image of an object to be inspected;

means for selecting portions of the first signal as second signals respectively, the second signals representing respective partial images of the inspected-object image, the partial images being of a given size;

means for comparing the second signals with a third signal representing a predetermined reference image of a size equal to the size of the partial images, for executing pattern matching between the partial images and the reference image, and for calculating scores of the pattern matching between the partial images and the reference image;

means for selecting a maximum score from among the scores calculated by the comparing means;

means for generating a fourth signal representing a position of the partial image corresponding to the maximum score, the partial-image position being relative to the inspected-object image;

means for determining an invalid area of the reference image according to a fifth signal representing a predetermined unreliable image area; and means for excluding a part of the third signal, which corresponds to the invalid area of the reference image, from the pattern matching executed by the comparing means;

wherein the predetermined unreliable image area is an area within the reference image which fails to provide an accurate indication of an actual appearance of a corresponding area of the reference image due to reflection of light.

10. Apparatus as recited in claim 9, wherein the reference image includes a background portion and an effective portion and at least a part of the invalid area of the reference image extends in the effective portion of the reference image, and wherein said means for determining an invalid area of the reference image determines an invalid area having at least a part thereof in the effective portion of the reference image, said means for excluding thereby excluding a part of the effective portion of said reference image from the pattern matching with the partial images of the inspected-object image.

11. Apparatus as recited in claim 10, wherein said means for determining an invalid area of the reference image determines a defective portion in the effective portion of the reference image, said means for excluding thereby excluding the defective portion in the effective portion of said reference image from the pattern matching with the partial images of the inspected-object image.

12. Apparatus as recited in claim 11, wherein said means for determining comprises means for identifying an area which is invalid due to reflection of light.

13. An apparatus comprising:

means for generating a first signal representing an image of an object to be inspected;

means for selecting portions of the first signal as second signals respectively, the second signals representing respective partial images of the inspected-object image, the partial images being of a given size, wherein each of the partial images is divided into a plurality of zones, and each of the second signals has components corresponding to the zones respectively;

means for comparing the second signals with a third signal representing a predetermined reference image of a size equal to the size of the partial images, for executing pattern matching between the partial images and the reference image, and for calculating scores of the pattern matching between the partial images and the reference image, wherein the reference image is divided into a plurality of zones corresponding to the zones of each of the partial images respectively, and the third signal has components corresponding to the zones respectively;

means for selecting a maximum score from among the scores calculated by the comparing means;

means for generating a fourth signal representing a position of the partial image corresponding to the maximum score, the partial-image position being relative to the inspected-object image;

means for designating each of the zone-corresponding components of the third signal as one of an unreliable zone-corresponding component and a reliable zone-corresponding component according to a fifth signal representing predetermined valid and invalid image zones; and means for excluding the unreliable-designated zone-corresponding components of the third signal from the pattern matching executed by the comparing means, wherein the zone-corresponding components of the third signal designated as unreliable zone-corresponding components are zone-corresponding components which fail to accurately indicate actual appearances of corresponding portions of the reference image due to reflection of light.

14. Apparatus as recited in claim 13, wherein the reference image includes a background portion and an effective portion and at least a part of one invalid image zone extends in the effective portion of the reference image, and further comprising means for generating said fifth signal to represent said one invalid image zone having a part thereof extending in the effective portion of the reference image, said means for excluding thereby excluding a part of the effective portion of said reference image from the pattern matching with the partial images.

15. An apparatus comprising:

means for generating first bit maps each having a plurality of bits, the first bit maps representing partial images of an image of an object to be inspected respectively, wherein each of the partial images is divided into a plurality of zones corresponding to the bits of the related first bit map respectively;

means for comparing the first bit maps and a second predetermined bit map bit by bit, for executing pattern matching between the partial images and a predetermined reference image represented by the second bit map, and for calculating scores of the pattern matching between the partial images and the reference image, wherein the second bit map has a plurality of bits corresponding to the bits of each of the first bit maps, and the reference image is divided into a plurality of zones corresponding to the bits of the second bit map;

means for selecting a maximum score from among the scores calculated by the comparing means;

means for generating a signal representing a position of the partial image corresponding to the maximum score, the partial-image position being relative to the inspected-object image;

means for designating each of the bits of the second bit map as one of an unreliable bit and a reliable bit according to a third predetermined bit map having predetermined valid and invalid bits; and means for excluding the unreliable-designated bits of the second bit map from the pattern matching executed by the comparing means, wherein the bits of the second bit map designated as unreliable-bits fail to provide accurate indications of actual appearances of corresponding portions of the reference image due to reflection of light.

16. Apparatus as recited in claim 15, wherein said reference image includes a background portion and an effective portion, at least one of said second bit maps of the reference image includes an effective portion representing said effective portion of said reference image, and at least one of the invalid bits of the third predetermined bit map is in a position corresponding to the effective portion of the reference image, and said means for designating each of the bits of the second bit map designates at least one of the bits in the effective portion of said at least one second bit map of the reference image as an unreliable bit, said means for excluding thereby excluding said at least one of the bits in the effective portion of said at least one second bit map representing said predetermined reference image from pattern matching with the first bit maps representing said partial images.

* * * * *